March 9, 1943.  A. A. STUART, JR  2,313,682
COMPASS SYSTEM
Filed Nov. 5, 1940  2 Sheets-Sheet 1

Inventor
Alfred A. Stuart, Jr.
BY
David F. Moody
ATTORNEY

March 9, 1943.  A. A. STUART, JR  2,313,682
COMPASS SYSTEM
Filed Nov. 5, 1940  2 Sheets-Sheet 2
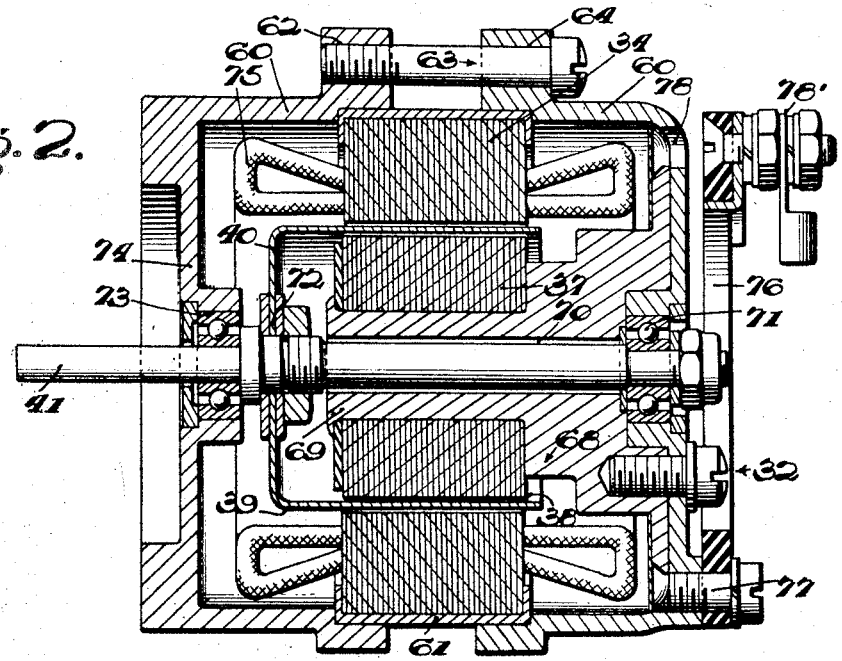
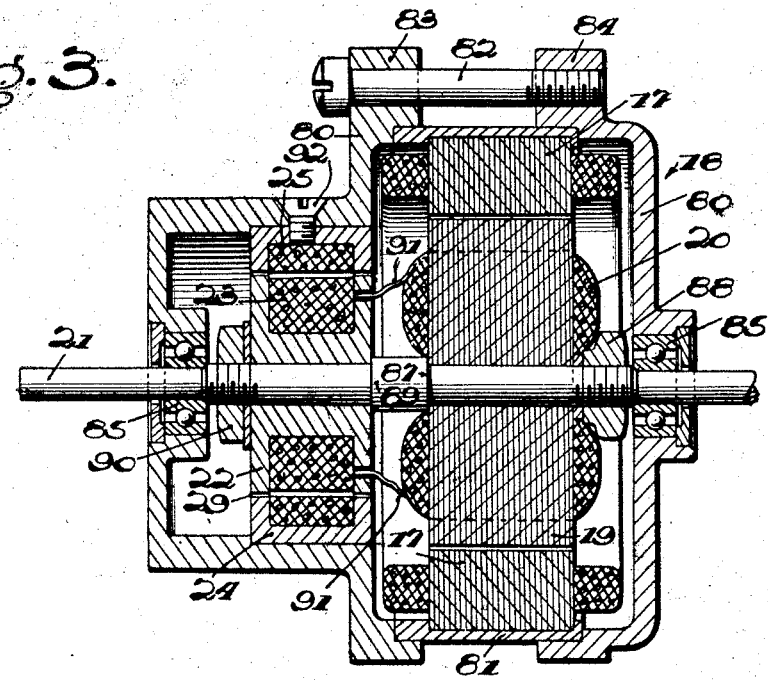
Inventor:
Alfred A. Stuart, Jr.
BY David F. Woody
ATTORNEY Patented Mar. 9, 1943

2,313,682

UNITED STATES PATENT OFFICE 2,313,682

COMPASS SYSTEM

Alfred A. Stuart, Jr., Hasbrouck Heights, N. J., assignor to Bendix Aviation Corporation, South Bend, Ind., a corporation of Delaware Application November 5, 1940, Serial No. 364,444

1 Claim. (Cl. 33—204)

This invention relates to navigational compasses and particularly to a compass system in which a number of repeater indications is provided.

It is an object of the present invention to provide a novel type of compass in which low directive forces may be successfully transferred and amplified in order to operate a motor system for giving master and repeater compass indications.

It is another object of the invention to provide in a compass system, a novel type of induction motor which will minimize the effects of hunting.

A further object of the invention lies in the provision of a novel means for transferring electrical energy from a rotating shaft to a fixed point.

Other objects include the provision of a compass system in which a course may be easily set out and interpreted and in which low directive electrical forces may be amplified in order to give accurate bearing indications at a number of stations.

These and other objects of the present invention will become readily understood upon a study of the following specification when made in conjunction with the attached drawings, throughout which like parts are designated by like reference characters.

Fig. 2 is a longitudinal sectional view of a motor which is part of the present invention; and Fig. 3 is a sectional view of a novel type of electrical coupling which is employed in the present invention.

Figure 1:
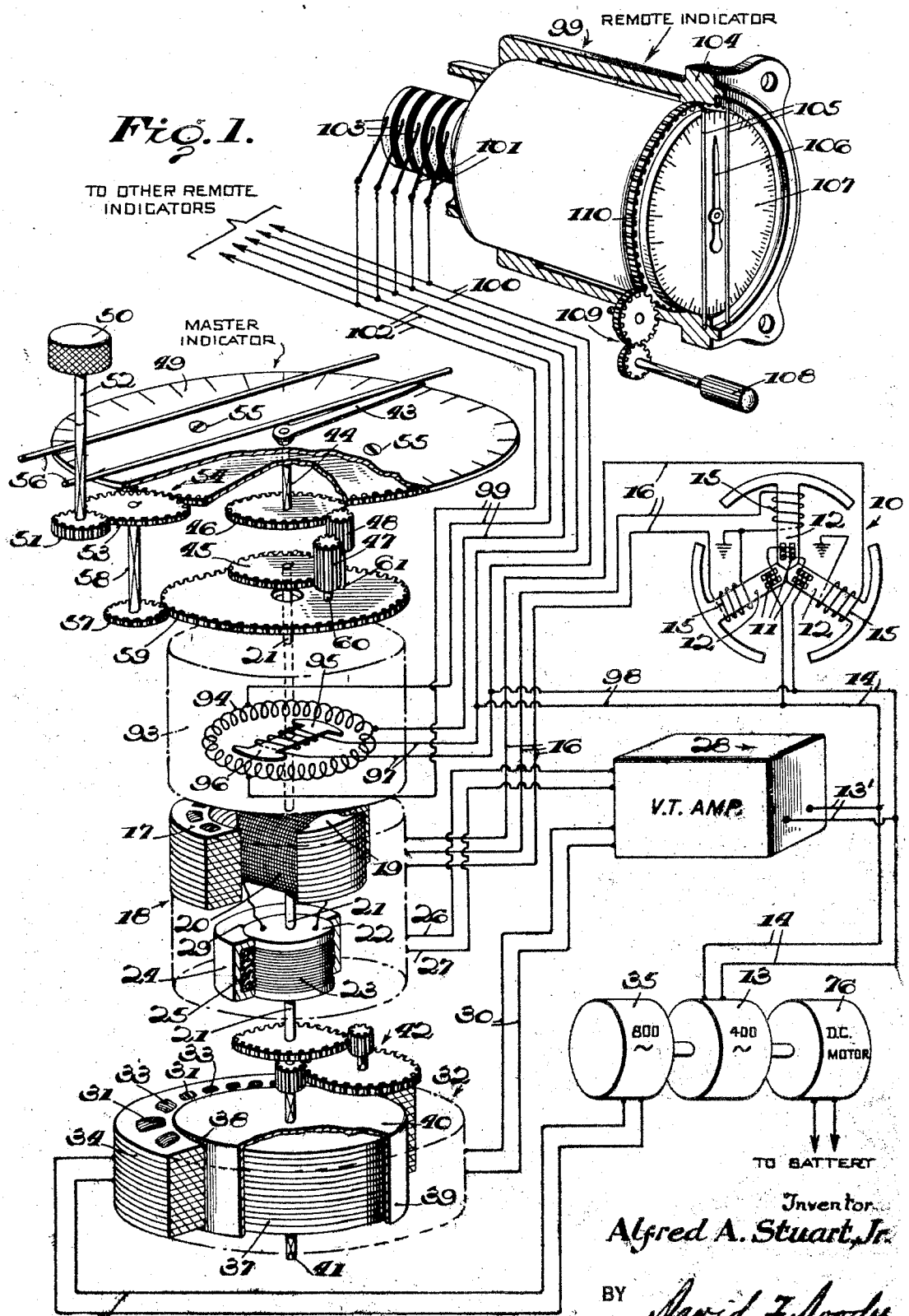
Fig. 1 is a representation, partly schematic, and partly in perspective, of a compass system of the present invention.

Generally speaking, the present invention comprises a compass system which may be of the magnetic needle type, or the earth inductor type, utilizing a flux gate and a torque amplifier, similar in some respects to the type described in applications Serial No. 336,444, May 21, 1940, and 340,396, June 13, 1940, which are assigned to the assignee of the present invention.

In addition to the general system shown in the aforesaid applications, the present invention utilizes a novel course selecting and indicating mechanism and a new type of inductive coupling for transferring electrical energy from a rotating shaft to a fixed position, and also, a new type of induction motor, the rotor of which has a moment of inertia of a value appreciably less than that of the conventional induction motor.

Having reference to Fig. 1, 10 designates a magnetic flux gate of permeable material, such as "Mumetal" or "Permalloy," having an exciting winding 11 carried by an inner portion of each of legs 12, and connected to alternator 13 through leads 14. Legs 12 also carry output windings 15 which are connected through leads 16 to the stator portion 17 of the motor of a self-synchronous system, such as an "Autosyn" 18, which has a rotor portion 19, carrying a coil 20. Stator portion 17 is of the well-known type having three symmetrically spaced taps (e. g., as shown in Reichel et al. Patent No. 2,038,059) to which are connected the leads 16. Rotor 19 is connected to a shaft 21, which carries a core member 22 of magnetic material, such as soft iron, about which is wound primary winding 23 connected in series with coil 20. Surrounding core 22 and coil 20 is a shell member 24 of magnetic material, such as soft iron, and internally of which there is wound a secondary winding 25, having output leads 26 and 27 connected to the input of a vacuum tube amplifier 28, of any well-known design, which is energized by alternator 13 through leads 13'. Core member 22 is separated from shell member 24 by an air gap 29, which is sufficient to prevent frictional engagement of elements 22 and 24, but which preferably has as low a width as is possible in shop practices.

The output of amplifier 28 is connected through leads 30 to one phase winding 31 of two-phase induction motor 32. Phase winding 31 and another phase winding 33 are wound within a stator member 34 of iron laminations in the manner usual for a two-phase stator winding. Phase winding 33 is energized by alternating current from alternator 35 through leads 36. A second stator portion 37 of iron laminations is fixed within stator 34 and separated therefrom by an air gap 38. The cylindrical wall 39 of a cup-shaped member 40 is contained within air gap 38, and is mounted to rotate therein upon rotation of shaft 41 to which it is affixed in a manner shown more specifically in Fig. 2. Shaft 41 is connected to shaft 21 through any suitable reduction gears 42, and rotation of shaft 21 will move pointer 43, which is fixed to the outer end of a stub shaft 44. Motion is transmitted to shaft 44 from shaft 21 by means of gears 45 and 46 which are in engagement with intermeshed pinions 47 and 48, respectively.

For a purpose to be described below, means are provided for the simultaneous rotation of pointer 43 and scale 49. For this reason, a knob 50 is connected to a pinion 51 through a shaft 52, pinion 51 drives a gear 53, which meshes with a spur gear 54, which is fastened to the under-side of scale 49 by means of screws 55. With this arrangement, rotation of knob 50 will of course, cause scale 49 to rotate through the action of the gear train, just described. Lubber lines 56 are fixed with respect to a selected axis of a carrying vehicle, such as an aircraft or marine vessel, and are provided so that an operator in turning knob 50, may indicate a course upon which the vehicle is to be headed. When, upon rotation of scale 49, the value of the selected course appears equally between each of the lubber lines 56, the vehicle may be then steered until pointer 43 falls between the lubber lines 56, and in this condition pointer 43 and scale 49 indicate that the vehicle is headed on the selected course.

Rotation of scale 49 through a definite arc (by manipulation of knob 50), without a corresponding rotation of pointer 43 through the same arc, would cause an error to be introduced between the scale 49 and the pointer 43. In order to obviate the introduction of an error of this type, a planetary gear arrangement, of which gear 45 becomes the central or sun gear, and pinions 47 and 48 become planet gears, is provided. Gear 45 is intended to be rotated only through the action of motor 32 since shaft 21 is rotatable only by operation of motor 32. Gear 53 is attached to a pinion 57 by means of a shaft 58, which pinion engages with planetary gear 59. Gear 59 carries spindles 60 and 61 of pinions 47 and 48 respectively, which pinions are freely rotatable about these spindles. When the pilot or navigator turns knob 50 to rotate scale 49, pinion 57 will be rotated by motion of gear 53 causing gear 59 to rotate the spindles 60 and 61 through an arc about shaft 21 as a center. In rotating about gear 45, which remains fixed if motor 32 is still, pinions 47 and 48 are made to turn and transmit angular motion to gear 46 which of course, rotates pointer 43. Since it is desired to rotate scale 49 and pointer 43 through equal angles upon manipulation of knob 50, the gear system above described for rotating pointer 43, can be readily designed to have the same value as the gear train which causes rotation of scale 49.

Lubber lines 56 may be horizontal and parallel to the fore and aft axis of the carrying vehicle, or they may be vertically disposed, that is, at right angles to the fore and aft axis of the vehicle but parallel to the vertical plane passing through the fore and aft axis of the vehicle. In order to set a desired course, without disturbing the operation of motor 32, it is necessary only for a navigator to turn knob 50 until the numerical value of the course shown on scale 49 appears within lubber lines 56. It will be readily understood, of course, that the manual course selection may be obtained through rotation of knob 50, regardless of whether gear 45 is at rest or is being rotated by motor 32. Any variation from the course selected will readily appear as a left or right deviation of pointer 43, and maintenance of the desired course may be obtained by merely steering the vehicle so as to keep pointer 43 from varying to the right or left of the selected course.

The operation of a compass system having a flux gate, such as 10, connected to an "Autosyn," such as 18, in a manner so that the voltage induced in the rotor of the "Autosyn" may be amplified, and used to energize one phase, of a two-phase induction motor, is fully described in the above-identified application Serial No. 340,396 but a brief description of the system shown in Fig. 1 will now be given so that its operation will be readily understood.

When alternating current from alternator 13 energizes winding 11, at a certain value of current between zero and maximum in each half cycle, which value may be readily determined by experiment, the portion of legs 12, immediately adjacent and surrounding the three portions of windings 11, will become saturated and will remain saturated until the value of the alternating current in each half cycle falls below the level necessary to maintain saturation. For each interval, in which the alternating current maintains the inner portion of legs 12 saturated, the earth's field is prevented from threading in sequence through legs 12, and is forced to travel completely or partially through air in threading from one of legs 21 to the others. This change in the path of the earth's flux causes a change in the number of lines of flux threading the three legs 12, and voltages are induced in the output windings 15 due to this change of flux. These voltages are carried through leads 16 to a stator 17 of "Autosyn" receiver 18, and induce a resultant voltage in the winding 20 of rotor 19. Upon induction of a voltage therein current flows in coil 20 and in winding 23 which is in series with coil 20. This voltage is alternating at the frequency of the alternating current set up in output windings 15, and is transferred by electromagnetic induction to the secondary winding 25. The magnetic core 22 and the magnetic shell 24, which enclose windings 23 and 25, increase the magnetic flux in the local magnetic circuit between windings 23 and 25, increasing the inductance, and therefore increasing the voltage induced in secondary winding 25 by the current in primary winding 23 over that which would be induced in the absence of the magnetic circuit shown. The alternating current voltage induced in secondary 25 is led to the input of vacuum tube amplifier 28 through leads 26 and 27, and is amplified to any desired value, and after amplification is led through conductors 30 to the phase winding 31 of two-phase motor 32. Since the other phase winding 33 is constantly energized by alternator 35 through leads 36, upon voltage being impressed upon phase winding 31, motor 32 rotates shaft 21 and pointer 43, until voltage is removed from phase winding 31.

Voltage will be removed from phase winding 31 when rotor 19, which is carried by shaft 21, has been turned to the null point of the voltages induced in stator portion 17 by means of output windings 15. The voltages induced in stator portion 17 have a single-phase relation to each other and vectorially, they can be combined into a single resultant voltage which, upon induction into rotor and after amplification in amplifier 28, will energize phase winding 31, causing induction motor 32 to rotate rotor 19 to a null position; that is, the position in which the plane of the rotor coil is parallel to the resultant field of stator portion 17. As the resultant field depends on the angular disposition of the legs of flux gate 10 in the horizontal plane of the earth's field and since this null position will be rotated degree for degree upon rotation of the flux gate, it will be seen that indications of azimuth may be had through 360 degrees.

There are two null positions 180 degrees apart, but ambiguity is avoided, since upon one null position being assumed by the rotor 19, it can not thereafter align itself with the null position 180 degrees away, as the phase reversal incident upon the rotor's passing through the null will cause the magnetic field of the current in rotor 19 to react with the field of the resultant current in stator 17 so as to always turn rotor 19 in the direction corresponding to the direction of rotation of flux gate 10.

Reference to Fig. 1 indicates that alternators 13 and 35 are connected by a common shaft to the rotor of a D. C. motor 76, which is preferably of any conventional constant speed design, and which is energized by means of a storage battery, not shown. Alternator 13 energizes the saturating winding 11 (through conductors 14) at any desired frequency, for example 400 cycles. Current from alternator 35 is of double the frequency of current from alternator 13 (800 cycles) and is connected through leads 36 to one phase winding 33. Since the other phase winding 31 is energized, as above stated, by energy from the output of coils 15 as amplified in the vacuum tube amplifier 28, it will be appreciated that in order to obtain operation of two-phase induction motor 32, the frequency of phase 31 must be equal to the frequency of phase 33. It is necessary to double the frequency of phase winding 33, in order that its frequency might be equal to the frequency in phase winding 31, because in the operation of saturating a portion of legs 12 with alternating current, the frequency in the output of coils 15 will be double that of the exciting voltage. The exciting voltage being at 400 cycles, the output of coils 15 will be at 800 cycles.

It has been stated above that in each half-cycle of excitation of winding 11, there is an interval during which the inner portions of legs 12 is saturated and an interval during which these portions are unsaturated. When saturated, the earth's flux cannot flow from one of legs 12 to either or both of the other legs without going through air. The earth's flux is driven out of legs 12, at least in the region of coils in winding 11 by the presence of the flux due to the saturation current of winding 11, causing the number of lines of the earth's flux cutting coils 15 to decrease, setting up a voltage pulse in coils 15. During one half-cycle of alternating current from source 13, current will rise sinusoidally from zero at zero degrees until saturation is attained and then to a maximum at 90 degrees, then fall to zero again at 180 degrees.

If winding 11 is so chosen that the ampere-turns are proper for saturating the proximate portion of legs 12 at 45 degrees, then from zero degrees to 45 degrees, the earth's flux flows through legs 12 in sequence without difficulty, but the saturation characteristics of "Permalloy" and "Mumetal" are such that a very small increase in current just at the threshold of saturation will cause saturation to take place. Thus, during the interval 45 degrees +, saturation due to current from alternator 13 causes the earth's flux to leave legs 12 and flow through air until at 135 degrees the value of the current in winding 11 falls below the saturating value and the earth's field re-enters legs 12, which now, due to their superior permeability and absence of saturating flux, afford the earth's flux a path of reluctance lower than the path in air. From 135 degrees until 225 degrees (second half-cycle), the earth's flux will thread legs 12, and upon saturation at 225 degrees, it will be again forced to flow through air. In each half-cycle, at the 45, 135 and 225, 315 degree points, the earth's flux is abruptly changed causing a pulse of voltage in coils 15 at each of these points. These pulses will be alternately of opposite sign, since at 45 and 225 degrees the earth's flux is leaving legs 12 and at 135 and 315 degrees, it is entering legs 12, thus cutting coils 15 in opposite directions, and when resonated, these pulses are smoothed out into sine waves and since there are two pulses (of opposite sign) for every half cycle of excitation, the frequency of the current in coils 15 is double the excitation frequency. Resonance is obtained due to the inductive action of the iron in the "Autosyn" stator 17.

In Fig. 2, the two-phase induction motor of the present invention is shown in section and comprises a two-part housing 62 having an annular spacing ring such as a metal channel member 63 against which the housing members 62 are tightly drawn by means of upstanding screw threaded lugs 64, and screw member 65 which pass through holes in lugs 66. Annular ring 63 confines the laminated iron stator 34 through which are threaded the two-phase winding 67, in any conventional manner. The inner stator member 37 includes a stack of disc-like iron laminations, carried by central core member 68 which has its outer end 69 upset by spinning or any other suitable method, so as to confine the laminations into a tightly packed stator member. Core member 68 has a central bore 70 which is counterbored at one end to receive a conventional ball-bearing 71. Cup-shaped rotor member 40 is disposed in the air gap space 38 with sufficient clearance between its cylindrical wall 39 and stator members 34 and 37 as to be freely rotatable in the air gap space 38. Shaft 41 is fixed to rotor member 40 by any suitable means, such as the screw threaded nut and bolt arrangement, which is shown at 72. One portion of housing 62 contains a bearing member 73 in end-wall 74, and bearings 71 and 73 support shaft 41, so that it may be freely rotated within bore 70 of core member 68. A rotating electrical field is set up within stator 34 by means of two-phase current connected to the windings 75, for example, as shown schematically in Fig. 1.

A ring 76 of insulating material such as Bakelite is mounted on the end face of one of housing parts 60, by means of a plurality of studs 77, and suitable terminals 78 are mounted thereon for connection of two-phase windings 75 with an external circuit, such as that shown in Fig. 1. Although the connections of winding 75 to terminals 78 are not shown, it will be understood that leads may be brought out through one or more apertures 79 of housing 60.

Rotor member 40 may be formed of any good conductive material, such as copper or aluminum, and as the rotating electrical field sets up a concentrated flux in stator 34 and traverses the air gap 38 to thread through stator memer 37, eddy currents will be set up in rotor 40 and the interaction of the magnetic field with the eddy currents of the rotating magnetic field will cause rotor 40 to be rotated in one direction or the other, at synchronous speed minus slip, depending upon the phase relation between the two-phase windings. Rotor 40 includes no magnetic material and may be of thin gauged metal, so that its moment of inertia as compared with the moment of inertia of the usual iron rotor of an induction motor, will be extremely low, for example, on the order of 1/30 or less. By virtue of its low moment of inertia, rotor 40 will be started, stopped and reversed, with the minimum hunting or rotation of shaft 41. This item is of extreme value in a compass system as herein described or in other navigational and control systems where the ability of an indicator, such as pointer 43, to come to rest at its proper course indication, without oscillation or hunting, is of importance.

The brushless coupling above described with reference to Fig. 1, is shown in detailed section in Fig. 3. The two parts of housing 80 are separated by spacing member 81, which retains the stator portion 17, comprising iron laminations, and the usual "Autosyn" windings of the "Autosyn" 18. Housing members 80 are retained in assembled relation by means of a plurality of stud screw members 82, which pass through upstanding lug members 83 and fasten into screw-threaded portions 84. Shaft 21 passes transversely through housing portions 80, and is carried by conventional ball bearings indicated generally at 85. Rotor member 19 of iron laminations, carrying coil 20, is fixed by any conventional means, such as shoulder 87 and screw-threaded nut 88, so as to be rotatable with shaft 21. Spaced from rotor 19 along shaft 21 is core member 22 of soft iron or other magnetic material, which is held by means of shoulder portion 89, and screw-threaded nut 90 and thus rotates with shaft 21. Core member 22 carries primary winding 23, the ends of which are connected to the ends of coil 20 by means of a pair of conductors 91. Shell member 24 is held fixed within one of the housing portions 80, as shown by means of a plurality of screw stud members 92, which are tapped into the periphery of shell member 24. Secondary winding 25 is wound within shell member 24, and the ends thereof are brought out in any suitable manner for connection with an external circuit.

The flanged portions of core member 22 and shell member 24 are separated by an air gap 29 of small width, so that the magnetic material of members 22 and 24 will form a closed magnetic circuit encompassing primary winding 23 and secondary winding 25, with the lowest possible reluctance in the magnetic path. As core member 22 is of uniform configuration throughout, and as shell member 25 is likewise uniformly shaped throughout, and since windings 23 and 25 are wound uniformly within members 22 and 24, respectively, there will be faithful transfer of electrical energy from winding 23 to winding 25 regardless of angular disposition of shaft 21, thus, as voltages induced in coil 20 of rotor 19 may vary with the angular displacement of rotor 19, with respect to stator 17, the inductive coupling shown will permit a frictionless and, yet an efficient transfer of electrical energy from rotating shaft 21 to fixed shell member 24.

The indicator which includes scale 49 and pointer 43 may be considered as the master indicator. Remote indicators may be provided at any desired number of repeating stations for duplicating the indications of pointer 43. A transmitting "Autosyn," or other type of self-synchronous transmitting motor (sometimes called an "Autosyn" generator), such as 93, has a stator portion 94, shown schematically in Fig. 1, and a rotor portion 95, likewise shown. Rotor 95 is fixed to shaft 21 and carries a coil member 96, which is energized by alternator 13 through leads 97, 98 and 14. An "Autosyn" receiving motor is contained in remote indicator 99, and leads 100 are connected to the rotor thereof, not shown, by the brush and slip ring connections 101. The stator portion of the "Autosyn" receiver (not shown) in remote indicator 99 is connected in parallel to the stator portion of "Autosyn" 90 through leads 102 and slip ring and brush connections 103. As indicated by the extensions of leads 100 and 102, other remote indicators may be connected in parallel to remote indicator 99. Housing 104 is fixed to a carrying vehicle in any conventional manner, and carries a pair of lubber lines 105, similar to lubber lines 56.

When the pilot at the master station heads the vehicle upon a given course, pointer 106 will indicate the course upon scale 107, and means are provided for permitting pointer 106 to be oriented after the fashion of pointer 43. Orientation of pointer 106 is obtained, merely by the turning of knob 108, which actuates the intermeshed pinions and gear arrangement 109, which coact with teeth or a ring gear 110 carried by housing of "Autosyn" 99. As dial or scale 107 is fixed with respect to this housing, rotation of knob 108 will cause scale 107 and pointer 106 to be turned together through any desired arc, and pointer 106 can be made to lie in parallel with lubber lines 105 to indicate an "on" course condition of the course, and then any deviation of pointer 106 to the right or left of this parallel condition will indicate a deviation of the craft from the selected heading.

While only one embodiment of the navigating system of the present invention has been shown and described, it is to be understood that the invention is not limited thereto, but only by the scope of the appended claim.

What is claimed is:

In a compass comprising a member sensitive to the directive force of the earth's magnetic field, a two-phase induction motor controlled by said member, an indicating device operated by said motor, means to refer indications of said indicating device to a selected axis of a carrying craft, a portion of said indicating device being carried by a shaft driven by said motor, a second motor having a stator portion electrically connected to portions of said member, and a rotor in which are induced voltages representative of the direction of the earth's magnetic field, connections between said rotor and one phase of said induction motor, an alternating current source for energizing the second phase of said motor, said phases being wound upon an exterior stator portion of said motor, said motor also having an interior portion and a rotor member connected to said shaft, said rotor member being of conductive material and having an annular portion thereof disposed between said exterior and interior stators so that upon energization of the two phases of said motor, induction of currents in said element will cause rotation thereof in a direction depending upon the phase relation between voltages induced in the windings of the two phases of said motor.

ALFRED A. STUART, Jr.